United States Patent [19]

Goodwin et al.

[11] Patent Number: 5,005,725

[45] Date of Patent: Apr. 9, 1991

[54] COVER RELEASE MECHANISMS

[75] Inventors: John C. Goodwin, Sunbury-on-Thames; Roy Kirby, Perivale; Ernest A. Langley, Hayes, all of United Kingdom

[73] Assignee: Dowty Maritime Systems Limited, Feltham, England

[21] Appl. No.: 374,244

[22] Filed: Jun. 30, 1989

[30] Foreign Application Priority Data

Jun. 30, 1988 [GB] United Kingdom ............... 8815583

[51] Int. Cl.$^5$ ............................................ B65D 41/00
[52] U.S. Cl. ................................................. 220/261
[58] Field of Search ....................................... 220/261

[56] References Cited

U.S. PATENT DOCUMENTS

| | | | |
|---|---|---|---|
| 3,221,495 | 12/1965 | Tweet | 220/261 X |
| 3,224,628 | 12/1965 | Emigh et al. | 220/261 |
| 3,313,113 | 4/1967 | Maxson et al. | 220/261 X |
| 4,248,257 | 2/1981 | Hardesty | 220/261 X |

Primary Examiner—Stephen Marcus
Assistant Examiner—Nova Stucker
Attorney, Agent, or Firm—Young & Thompson

[57] ABSTRACT

A cover release mechanism to enable a cover to be released while being subjected to a high inwardly acting pressure differential. The mechanism comprises:

a caliper mechanism having two or more claiper members mounted within the cover, at least one of which members has an associated sealing member; and a high energy release mechanism mounted within the cover so that it acts in association with the caliper mechanism.

Under normal operating conditions, with the cover member secured into position, the or each of the sealing members engages in a detent, normally a throughbore, in the cover. In order to release the cover, the high energy release mechanism is activated causing at least one of the caliper members to move, and the associated sealing means to disengage from the respective detents.

18 Claims, 8 Drawing Sheets

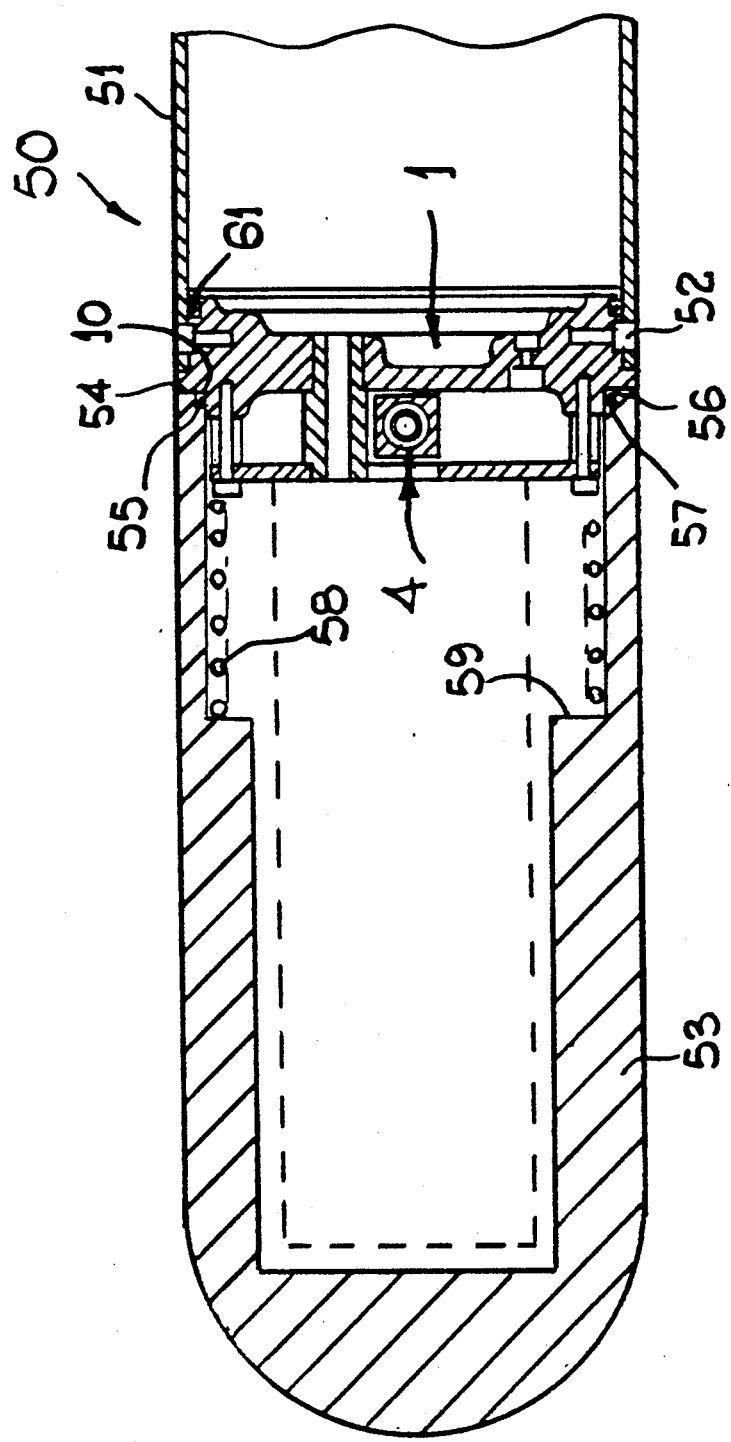

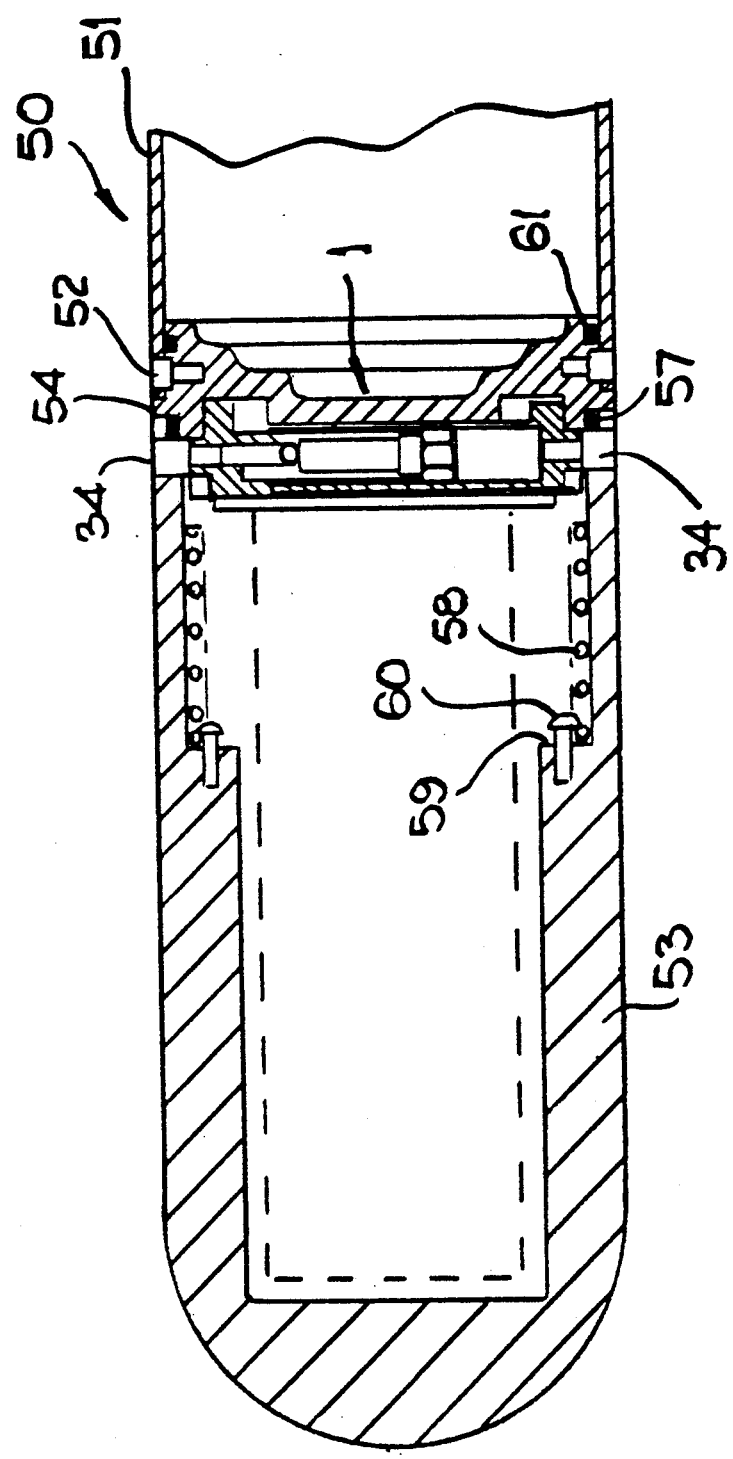

COVER RELEASE MECHANISMS

This invention relates to a cover release mechanism and, in particular, to a cover release mechanism which enables quick and easy release of a cover which is subjected to a high inwardly acting pressure differential.

Conventional cover release mechanisms for use in situations where the cover is to be released whilst being subjected to a large inwardly acting pressure differential, for example the cover which protects a sonar projector, do not provide a simple mechanical solution to the problem of equalising the pressure to enable cover release and where appropriate removal.

In practice this means such covers can be difficult, if not impossible, to remove without altering the conditions prevailing at the time, or, alternately the cover release mechanisms are complex in nature and subject to failure.

The present invention is concerned with providing a cover release mechanism which enables a cover to be removed whilst being subjected to high inwardly acting pressure differential.

In accordance with the present invention a cover release mechanism which enables a cover to be released whilst being subjected to a high inwardly acting pressure differential, comprises:

a caliper mechanism having two or more caliper members mounted within the cover, at least one of which members has an associated sealing member; and a high energy release mechanism mounted within the cover so that it acts in association with the caliper mechanism;

wherein under normal operating conditions, with the cover member secured in position, the or each sealing member engages in a detent in the cover and when the cover member is to be removed the high energy release mechanism is activated causing at least one of the caliper members to move and the associated sealing members to disengage from the respective detents.

Preferably, the detents in which the sealing members engage are throughbores in the cover.

Further, in accordance with the present invention a cover release mechanism for use with a pressure tight cover and which enables the cover to be released whilst being subjected to a high inwardly acting pressure differential, comprises:

a caliper mechanism having two or more caliper members mounted within the cover, at least one of which members has an associated sealing member; and a high energy release mechanism mounted within the cover so that it acts in association with the caliper mechanism;

wherein under normal operating conditions, with the cover member secured in position, the or each sealing member sealingly engages in a throughbore in the cover, and when the cover member is to be removed the high energy release mechanism is activated causing at least one of the caliper members to move and the associated sealing members to disengage from the respective throughbores enabling pressure equalisation to occur and release of the cover to be achieved.

In operation, the sealing members of the cover release mechanism may fulfil two functions in that it provides a sealing function and in addition act as a retaining pin.

In certain of the applications envisaged the cover release mechanism will be used in association with apparatus used on water borne craft. Now in such applications the pressure within the cover of the apparatus is normally maintained at one atmosphere, and the inwardly acting pressure differential results from the surrounding water, and is dependent upon the depth of the apparatus.

The net effect of an inwardly acting pressure differential is to clamp and lock the cover in place so making the removal of the cover without relieving, at least partially, the inwardly acting pressure differential, difficult if not impossible.

Preferably, each of the caliper members is provided with a linkage arrangement which connects it with a respective sealing member which may be disposed in a respective throughbore or detent of the cover.

In a preferred embodiment of the present invention, each of the caliper means has a fixed length of travel. However, in an alternative arrangement each of the caliper members is provided with means to enable the length of travel, either alone or relative to another caliper member, to be adjusted.

Preferably, each of the caliper members is provided with a sealing member.

In order to assist with the operation of the release mechanism and ensure/enhance a quick and effective release of the cover, the caliper members are preferably each provided with self centring means.

The provision of self centring means on, or in association with, each of the caliper members reduces the tendency, if present, for the release mechanism to operate in a manner which favours one, or a group of, caliper members. In turn this helps to prevent hang up of the cover and damage to any equipment housed within the cover.

In a preferred embodiment of the invention, the sealing members comprise a plug member which is provided with sealing devices, such as rubber 'O' rings. This type of sealing member also provides the cover release member with a pressure equalisation valve or fluid inlet valve, which is simple in operation.

Preferably, the sealing members can be assembled onto the caliper member with which it is to be associated after the cover has been installed.

Preferably, the cover release mechanism is also provided with means which prevent premature operation of the cover release mechanism. Preferably, this means comprise a or a number of pins, for example, shear pins, which shear on activation of the cover release mechanism.

The pins, or shear pins, may also act to resist the inwardly acting pressure differential on the sealing member, so preventing the sealing member being forced inwardly and the integrity of the system being destroyed.

In one particular embodiment of the invention, it is envisaged that the sealing members will be screwed into position on the associated caliper member through the respective throughbore after assembly of the cover.

With this particular arrangement the sealing member may be removed from the respective throughbore, without activation of the cover release mechanism. This enables a test device to be inserted into one of the throughbores so that the integrity of the remainder of the system can be pressure tested. The test, for example, may involve the injection of helium tracer gas under pressure.

The high energy release mechanism may comprise any suitable means, that is any mechanism which provides a fast and controllable force to act directly upon the caliper mechanism.

The high energy release mechanism may be arranged so that one or more parts thereof act upon distinct respective groups of caliper members.

In one embodiment, it is envisaged that two slidably engaged members are used to enclose a high energy source, so that when the source is activated each of the slidably engaged members engages a distinct group of caliper members. In this arrangement the two slidably engaged members will be propelled in opposite directions by the high energy source, and a surface on each of the members will engage a respective caliper member or group of caliper members.

In an alternative arrangement the high energy release mechanism includes a high energy source which forces a single member to act against all the caliper members.

In yet another arrangement the high energy release mechanism includes a high energy source which acts to rotate a plate/disc which has the sealing members commonly mounted thereto, and so cause the displacement of the sealing members.

Preferably, the high energy release mechanism is provided with an energy source which includes an explosive charge with projects at least one member so as to engage at least one of the caliper members of the caliper arrangement.

Alternatively, the high energy release mechanism is provided with an energy source which may comprise a hydraulically operated actuator, or a pneumatically operated actuator, or a mechanically or electro-mechanically (solenoid) operated actuator, which acts in a similar fashion to the explosive actuator above with respect to the caliper members.

In a preferred embodiment of the invention, the cover is also provided with a release means which once the cover release mechanism has been activated acts to force the cover from position. Preferably, the release means comprises a compression spring which acts to force the cover from position upon reduction of the inwardly acting pressure differential.

The invention also includes apparatus which incorporates a cover release mechanism made in accordance with the present invention.

Preferably, the cover and apparatus in the vicinity of the cover release mechanism is adapted so that the air/gas of the internal environment is trapped, so that on the influx of a heavy fluid or liquid, for example, water, the equipment housed within the cover is shielded from damage. This is of particular advantage where the cover is used to house sensitive equipment.

The invention will now be illustrated, by way of description of two examples of cover release mechanisms with reference to the accompanying drawings in which:

FIGS. 5 and 6 show cross sectional side view of the cover release mechanism shown in FIGS. 1 and 2 deployed for operation;

Figure 1:
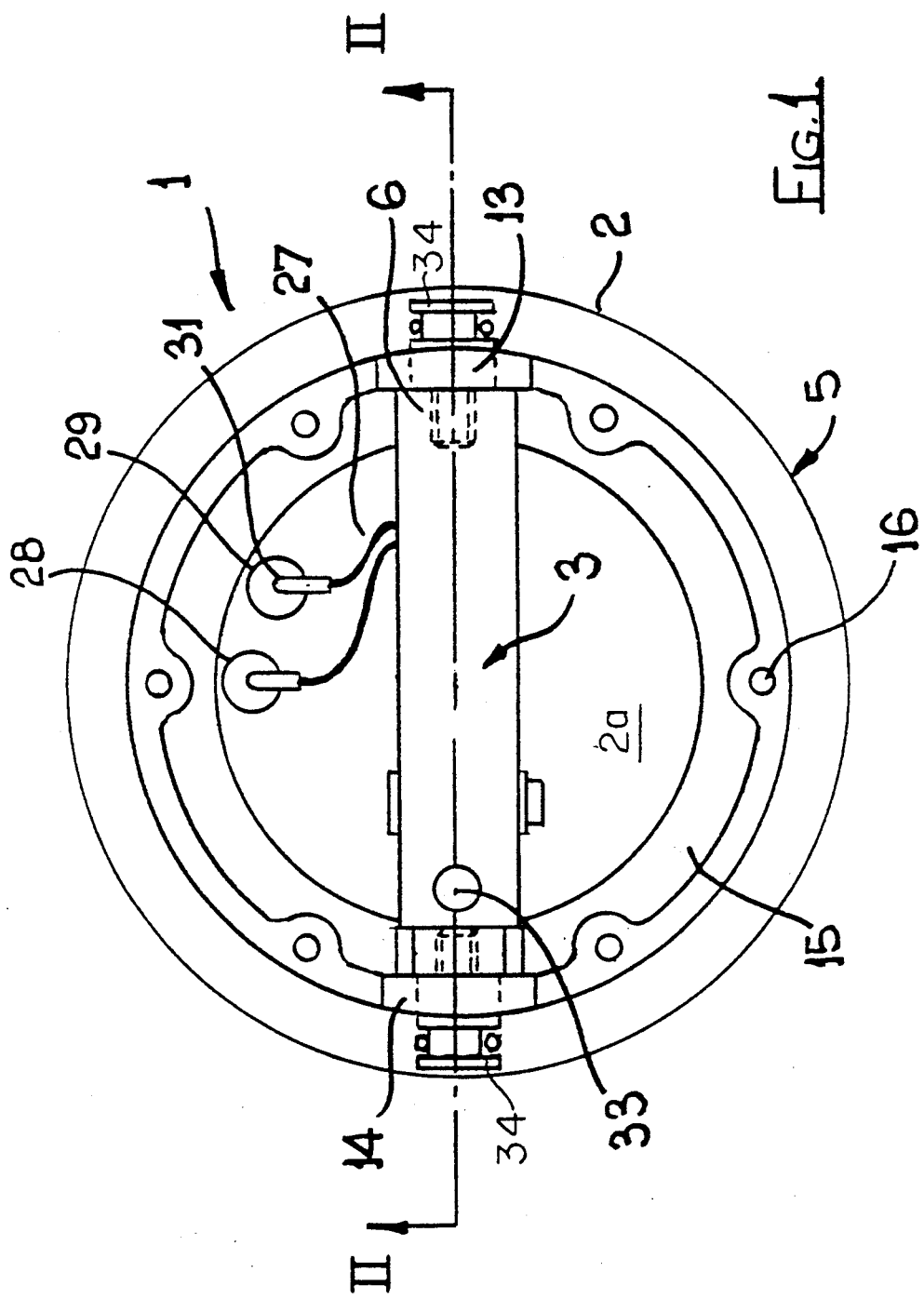
FIG. 1 shows a plan view of a first embodiment of cover release mechanism with the present invention.
Figure 2:
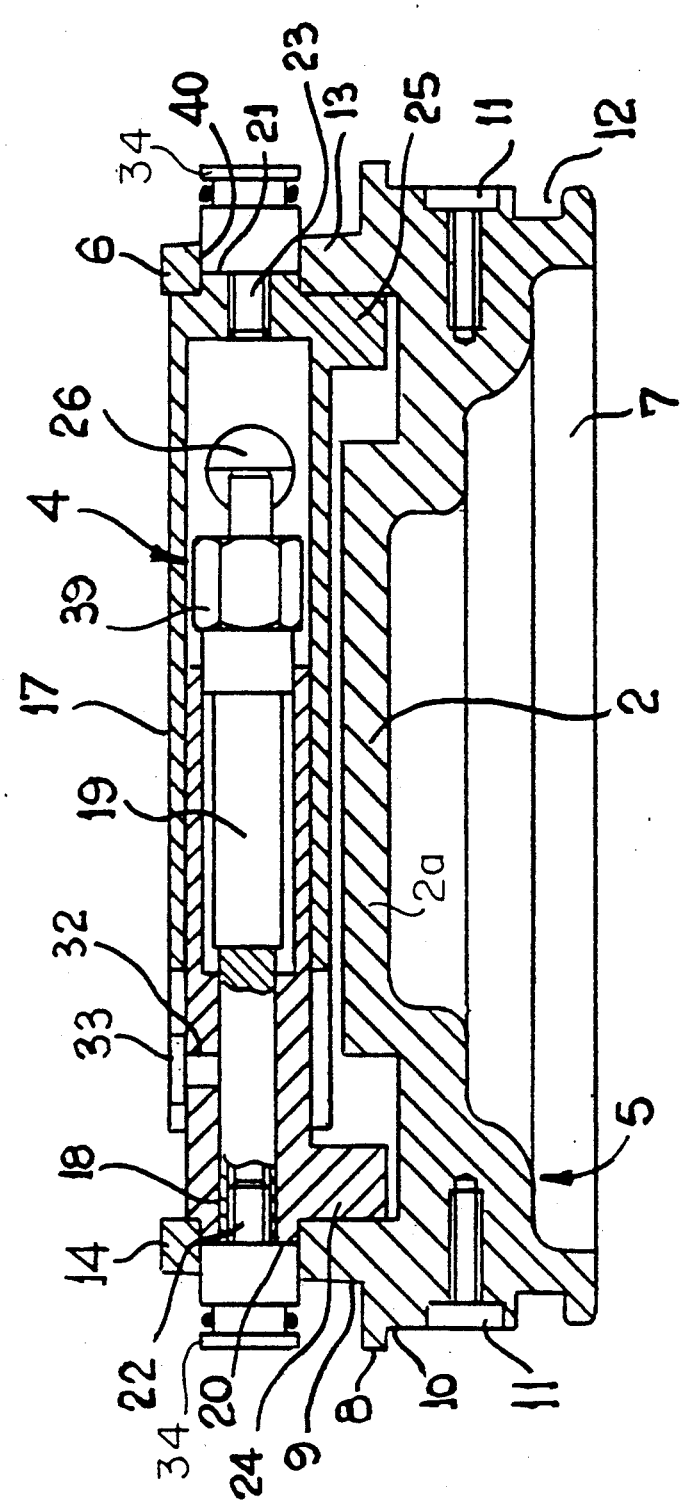
FIG. 2 shows a cross sectional side view of the cover release mechanism of FIG. 1.

Now referring to FIGS. 1 and 2 of the drawings, a cover release mechanism 1 made in accordance with the present invention, which comprises:

a base member 2 having a central section 2a; and a plunger arrangement or caliper mechanism 3 having an actuator 4 mounted in association therewith.

The base member 2 comprises:

a circular lower section 5; and an upper diametrically extending rib section 6;

and is normally manufactured from a metal such as aluminium.

The circular lower section 5 of the base member 2 is provided with:

a recess 7 in the lower surface thereof;

a circumferentially extending projection 8, which defines two lip sections 9 and 10 for engagement with the cover and associated apparatus;

a series of mounting indents 11 into which mounting screws may be placed;

a circumferentially extending groove 12 into which a sealing member may be placed;

two arm members 13 and 14, which define the rib section 6 and between which the caliper mechanism 3 is mounted;

a circumferentially extending indent 15, a portion of which is within the two arm members 13, 14; and a series of deployment holes 16 to further assist securing/mounting of equipment within the cover held in place by the mechanism.

The caliper mechanism 3 comprises:

an outer tubular member 17;

an inner tubular member 18 which slidably engages with the outer tubular member 17; and a projectile member 19 housed with the inner tubular member 18.

The outer tubular member 17 and the inner tubular member 18 support the sealing members for this particular embodiment of the invention.

The inner and outer tubular members are formed with their remote ends being partially closed by an end wall 20 and 21 respectively, having a screw threaded orifice 22 and 23 respectively, therethrough. The respective sealing members 34 of the mechanism are mounted onto the respective tubular member by means of a screw threaded retaining pin which is screwed into the screw threaded orifice of the respective tubular member 17, 18.

Also in the vicinity of the respective end wall the tubular members 17 and 18 are provided with spigot members 24, 25. The spigot members act as self centring means in combination with the central section 2a of the base member to ensure that the caliper mechanism acts cleanly and evenly, thereby preventing one sided operation and/or hang up of the cover.

A stop pin 26 connects through a slot to the outer tube 17 so as to allow interaction of the inner and outer tubular members 17, 18 and the withdrawal of the spigot member 24, 25.

The actuator 4 is an explosive actuator having an explosive charge 39 which is deployed within the outer tubular member 17. When activated the charge 39 projects the projectile 19 so pulling the inner tubular member 18 into the outer tubular member 17, thereby retracting the spigot members 24, 25 into the central section 2a of the base member 2. In conjunction with this the sealing members 206 are retracted into the cover, releasing the cover.

The inner tubular member 18 is provided with a hole 32, into which a shear pin 33 is housed. The shear pin 33 abuts against the outer tubular member 17 when the cover release mechanism is in an inactivated state, and acts to prevent premature operation of the caliper release mechanism.

When positioned in the base member 2 the inner and outer tubular members 17, 18 abut against the respective arm member 13 or 14 so that the screw threaded orifice 22 or 23 is in alignment with an orifice 40 formed in the respective arm member. Further, the spigot members 24 and 25 are deployed in the circumferential indent 15 formed in the lower section 5 of the base member 2. In this way the cover release mechanism 1 is provided with a means which limits the extent of travel of the tubular members 17, 18 of the caliper mechanism 3.

The actuator 4 is electrically triggered, and to effect this electrical leads 27 are passed through holes 28 and 29 formed in the lower section 5 of the base member 2. The leads 27 may be held in the holes 28 and 29 by means of sealing plugs 30 and 31, which prevent the ingress of unwanted material, for example water, through the cover release mechanism 1 into an area where sensitive equipment is housed.

Figure 3:
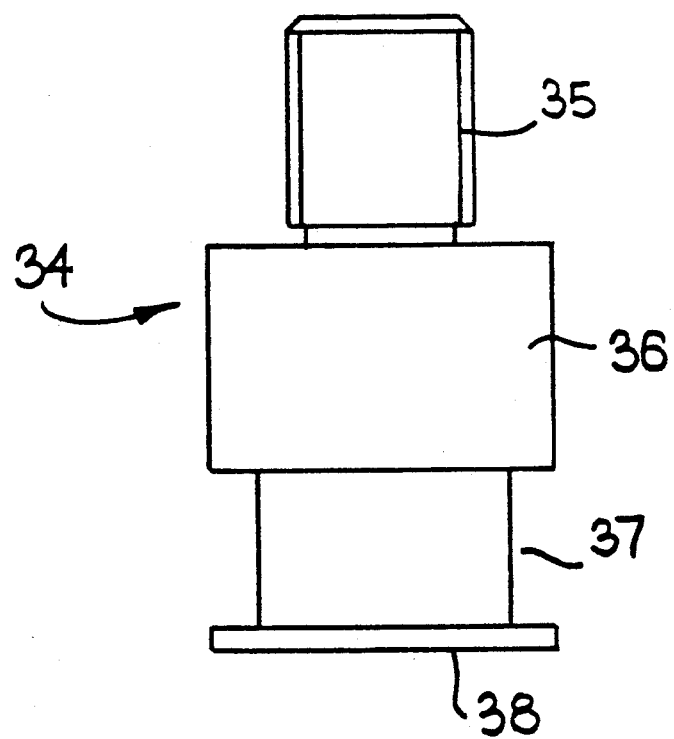
FIG. 3 shows a side view of a sealing member for use with the cover release mechanism of FIGS. 1 and 2.

Now referring to FIG. 3 of the drawings, a sealing member 34 for use with a cover release mechanism as described is shown.

The sealing member 34 is made from stainless steel and comprises a screw threaded portion 35 and a locating portion 36.

The screw threaded portion 35 is provided with a complimentary thread to that provided in the orifices 22 or 23 of the caliper mechanism.

The locating portion 36 has an annular groove 37 into which suitable sealing means, for example rubber 'O' rings, are located, and an upper surface 38 having a groove or recess for engagement with a screwdriver or alum key etc. to enable installation/removal of the sealing member 34.

In this particular embodiment the shear pin 33 acts to prevent the inwardly acting pressure differential, inwardly displacing the sealing member 34 and its associated tubular member 17, 18 and destroying the integrity of the cover release mechanism.

Figure 4A:
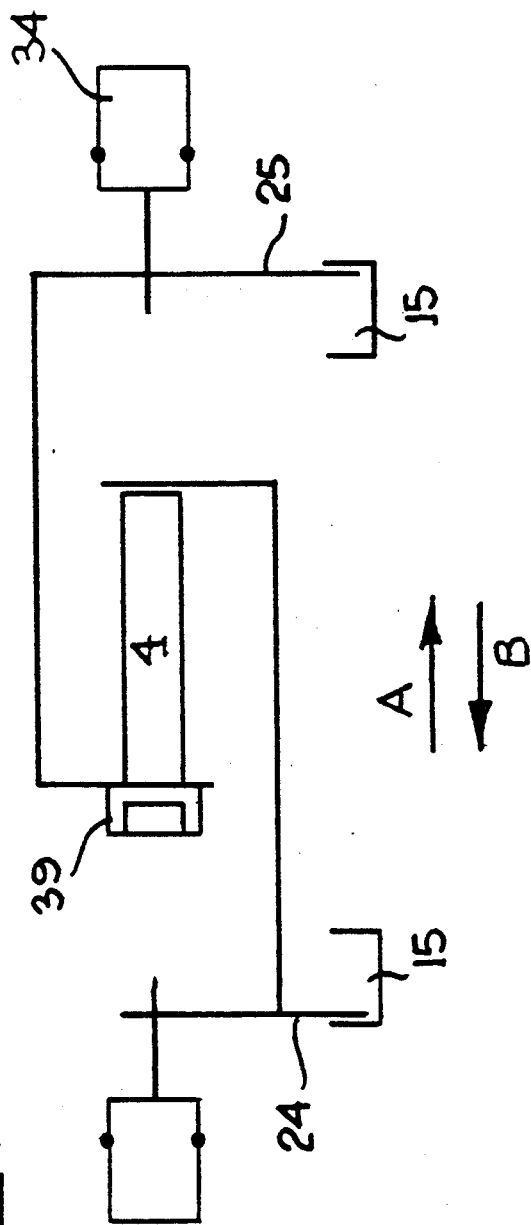
FIGS. 4A and 4B show a schematic plan of the operation of the cover release mechanism shown in FIGS. 1 and 2.
Figure 4B:
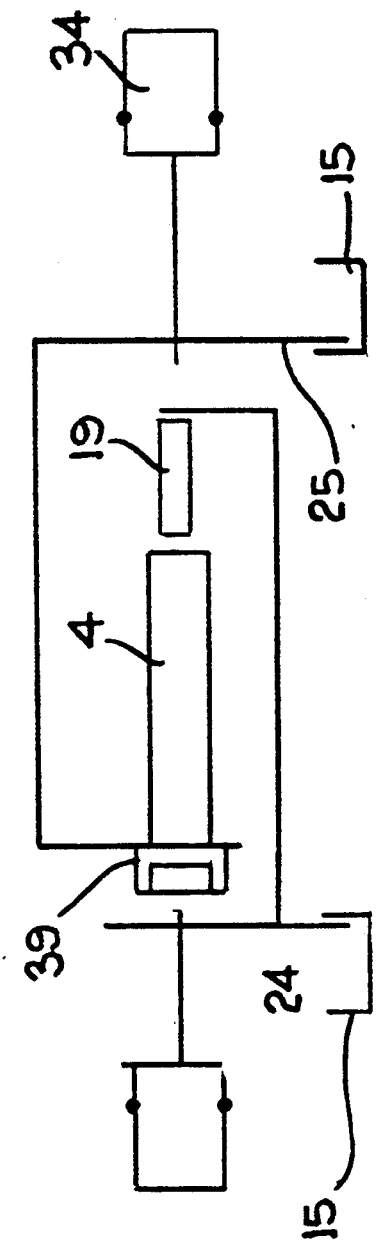

Now referring to FIGS. 4A and 4B, the mechanics of the operation of the caliper mechanism will now be explained. In these Figures the component parts have been numbered so that like components to those described above have like numerals. In FIG. 4A the cover release mechanism 1 is shown in the deployed or cover retaining position. In this position the sealing members 34 are in sealing engagement with the cover via the throughbore therein.

In operation, the explosive actuator 4 is detonated, this causes the projectile member 19 to move in the direction of arrow A, and impinge on the caliper members associated therewith so causing movement thereof and inward withdrawal of the associated sealing/retaining member or members 34. Simultaneously, the main body of the explosive actuator 4 moves in the opposite direction as indicated by the arrow B, and impinge the caliper members associated therewith, so causing inward withdrawal of the associated sealing/retaining member or members from the throughbore in an identical fashion to that described above.

Now referring to FIGS. 5 and 6 of drawings, the cover release mechanism 1 as described with reference to FIGS. 1 and 2 of the drawings is shown deployed in relation to a piece of apparatus 50.

The lower section 5 of the base member 2 is inserted into the main body 51 of the apparatus 50 so that the main body 51 circumferentially extends around the base member 2 and abuts against projection member 8 thereof and thereby engages the lip 10.

An 'O' ring seal 61 is disposed in the annular groove 12 in the base member 2 ensures a sealing contact is achieved between the base member 2 of cover release mechanism 1 and the main body 51.

Screws 52 are inserted through holes in the main body 51 and engage in the mounting indents 11 of the base member 2, thereby securing the cover release mechanism 1 in position in the apparatus 50.

Further, screws may be inserted through the deployment holes 16 (not shown in FIGS. 5 and 6) to help secure the base member 2 in position.

The cover 53 of the apparatus is now positioned over the cover release mechanism 1 so that it circumferentially extends around a section of the lower section 5 of the base member, and an edge 54 thereof abuts against projecting member 8 and engages with the lip 9.

The edge 54 of the cover 53 is formed with a circumferentially extending indent 55, which in combination with the lip 9 of the base member 2 defines an annular chamber 56, when the cover is positioned in relation to the cover release mechanism 1. An 'O' ring seal 57 is disposed in this annular chamber 56 to ensure sealing integrity of the apparatus.

Once the cover 53 has been aligned on the cover release mechanism 1 so that the caliper members are in alignment with throughbores in the cover 53, the sealing members 34 may be screwed into position.

Further, a compression spring 58 is provided in the cover member 53, in order to assist with the release of the cover 53 from the main body 51 of the apparatus when the cover release mechanism 1 is activated, and the inwardly acting pressure differential has been substantially relieved.

The compression spring 58 is positioned so that it abuts against a shelf member 59 in the cover, to which it is secured by screws 60.

In operation the compression spring 58 acts between the shelf member 59 and the base member 2 in order to effect release of the cover 53 from the apparatus.

The withdrawal of the sealing members 34 from the throughbore opens the environment. This causes an ingress of fluid (water) into the cover 53 bringing about pressure equalisation so enabling removal of the cover 53 under the action of the compression spring 58.

In order to protect the equipment housed within the cover 53 from damage under the ingress of fluid, the throughbores in the cover 53, and the base member 2 in the vicinity of the throughbores are dimensioned so as to trap small pockets of the internal environment (air). In this way the force of the ingress of fluid (water) is dissipated preventing/reducing damage to the equipment.

Figure 7:
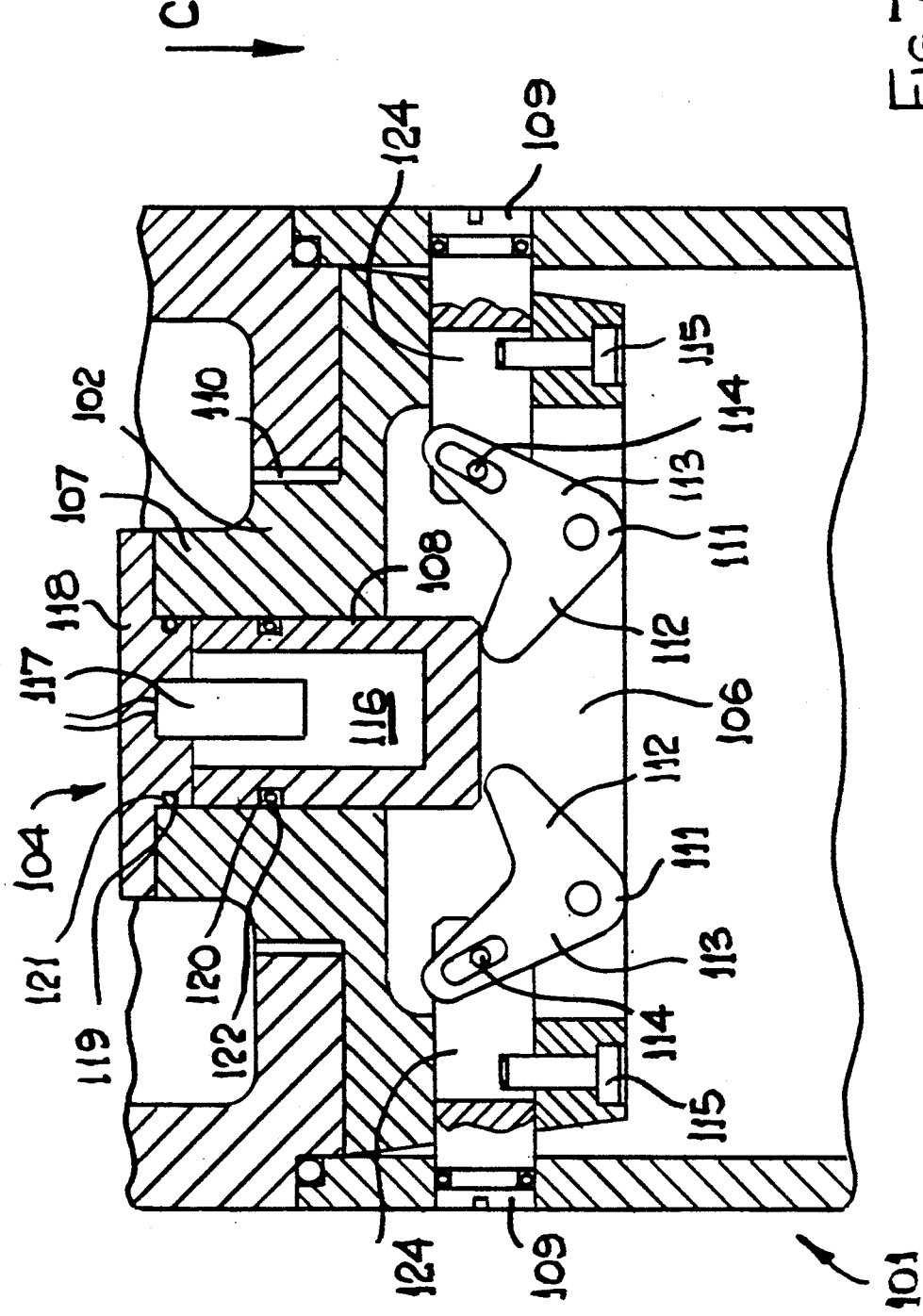
FIG. 7 shows a cross sectional side view of a second embodiment of cover release mechanism made in accordance with the present invention.

Now referring to FIG. 7 of the drawings, a second embodiment of cover release mechanism 10 made in accordance with the present invention is shown.

The cover release mechanism 101 comprises:
a base member 102; and
a caliper mechanism 103 which includes an actuator means 104.

The base member 102 is of generally circular configuration and includes:
an upstanding wall 105 which surrounds and defines a recess area 106;
a centrally positioned necked portion 107 have a throughbore 108; and
a circumferentially extending series of holes in the upstanding wall through which the caliper mechanism 103 and/or associated sealing members 109 may pass.

The necked portion 107 of the base member 102 is provided with an external screw threaded section 110. The screw threaded section 110 is used to engage a corresponding screw threaded section on apparatus the cover release mechanism is to be used in association with and which is used to locate and maintain the cover release mechanism in place.

The caliper mechanism 103 comprises a series of generally V-shaped members 111 each pivotally mounted to the base member 102. The V-shaped members 111 are circumferentially spaced around the base member 102.

Each of the V-shaped members 111 has a first arm 112 which engages with the actuator 104 and a second arm 113 which has a sliding pivot 114 which is associated with the respective sealing member 109. The spigot 115 also acts to prevent premature operation of the caliper release mechanism.

The sealing members 109 used in association with this embodiment of the invention are of similar construction to that shown in FIG. 3, hence no further detail is necessary or will be provided. The sealing members 109 are screw-threadedly engaged in a member 124, which is in slidably pivot engagement with the caliper V-shaped arm 111 via the pivot 114.

The sealing members 109 and/or the caliper mechanism 103 and/or the member 124 are positioned so that they extend into the holes of the circumferentially extending series of holes.

Each of the V-shaped members 111 has associated therewith a spigot 115 which projects downwardly through a section of the upstanding wall 105 and acts so as to limit the degree of movement, of the respective sealing member 109. The spigot 115 also acts to prevent premature operation of the caliper release mechanism.

The actuator means 104 comprises:
a hollow piston 116;
an explosive charge 117; and
a mounting plate 118.
Both the hollow piston 116 and the mounting plate 118 are provided with sealing members 119 and 120 respectively, which are disposed in grooves 121 and 122 thereof, respectively.

The actuator means 104 is disposed in the throughbore 108 so that the piston 116 has a surface 123 in close proximity to the arms 112 of the V-shaped member 111.

The cover of the apparatus with which the cover release mechanism 101 is associated is secured in position in a similar method to that described for the first embodiment of the invention. Hence no further information with regard to this aspect of the second embodiment of the invention.

In operation of this cover release mechanism, the explosive charge 117 is activated by electrical means causing the hollow piston 116 to travel in the direction of arrow C.

This in turn causes the V-shaped members 111 to pivot so that the sealing members 109 are inwardly displaced by the interaction of the member 124 and slidably pivot 114.

In this particular embodiment of the present invention, the member or members 124 act as the sealing members. Further, the spigot or spigots provided in relation to each of the members 124 is a shear pin which acts to prevent the inward displacement of the assembly under the action of the inwardly acting pressure differential. Thereby preventing the premature operation of the cover release mechanism and the destruction of the integrity of the system.

Figure 8:
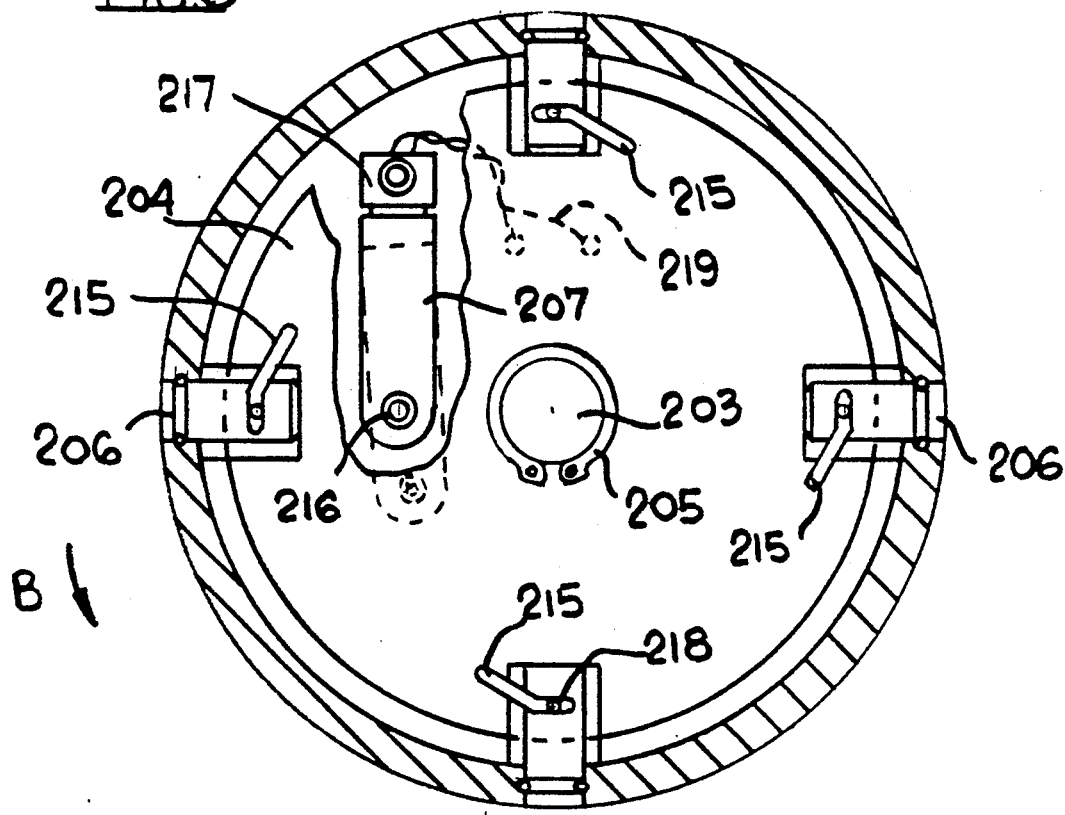
FIG. 8 shows a plan view of a third embodiment of cover release mechanism made in accordance with the present invention.
Figure 9:
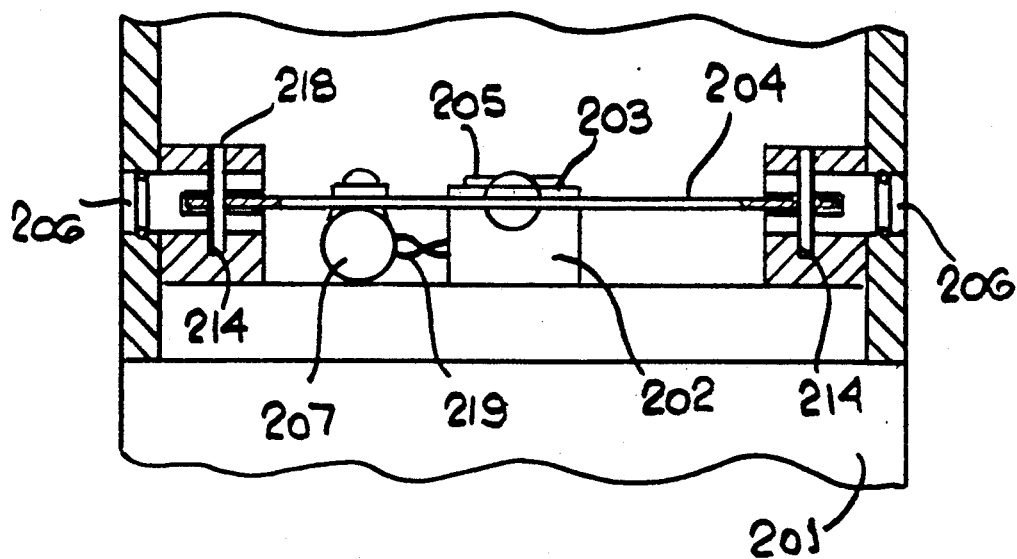
FIG. 9 shows a sectional side view of the cover release mechanism shown in FIG. 8.

Now, referring to FIGS. 8 and 9 of the drawings, a third embodiment of a cover release mechanism made in accordance with the present invention is described.

This cover release mechanism comprises:
a base member 201, having a central upstanding member 202 with a portion 203 of reduced diameter and four holes 214;
a plate member 204 rotably mounted onto the portion 203 of the central upstanding member 202 by means of a circlip 205 which engages in a groove (not shown);
a series of four sealing members 206; and
an actuator 207.

The plate member 204 is provided with four slots 215 and a mounting means 216 so that the actuator 207 can be mounted thereto.

The sealing members 206 are each disposed in a throughbore 208 of a cover member 209 and include:
a main section 210, having a vertically disposed throughbore 211 relative to the cover members 209;
a head section 211; and
a groove 212 which separates the main section 210 and the head section 211 and into which a seal 213 is disposed.

The sealing members 206 are mounted onto the base member 201 by a respective pin member 218 which engages in one of the holes 214. The pin members 218 extend through the respective throughbore 211 in the sealing member and protrude through the respective slot 214.

The slots 215 in the plate member 204 are generally shape with a main section 215a and an angled section 215b. Now when the sealing members 206 of the cover release mechanism are in a cover retaining position the pin members 218 engage in the angled section of the slot 215. In this way the sealing members 206 are locked into position preventing the inward displacement of the sealing members 206 under the action of the inwardly acting pressure differential.

The actuator 207 is an explosive actuator which is mounted at one end to the mounting means 216 on the plate member 204 and at the other end to a mounting means 217 provided on base member 201. Activation cabling 219 to the actuator 207 is provided by means of the mounting means 217 on the base member 201.

In operation the actuator 207 is activated, causing the plate member 204 to rotate in the direction of Arrow B. This disengages the pin members 218 from the angled section of the slot so that it engages with the main section of the slot. The continued rotation of the plate member 204 causes the pin member 218 to move further along the slot, so causing the sealing member to be inwardly withdrawn. The pressures inside and outside of the cover can then equilibriate, and resultantly the cover can be removed.

We claim:

1. A cover release mechanism which enables a cover to be released whilst being subjected to a high inwardly acting pressure differential, comprises:
an operating mechanism having at least two plungers mounted within the cover and a sealing member associated with each plunger; and
a high energy release mechanism mounted within the cover to activate the operating mechanism;
wherein under normal operating conditions, with the cover secured in position, each sealing member engages in a detent in the cover, and when the cover is to be removed the high energy release mechanism is activated causing said plungers to move and the associated sealing members to disengage from the respective detents.

2. A cover release mechanism as claimed in claim 1, wherein the detents in which the sealing members engage are throughbores in the cover.

3. A cover release mechanism as claimed in claim 1, in which the operating mechanism comprises a linkage arrangement which is connected to each plunger.

4. A cover release mechanism as claimed in claim 1, wherein each of the plungers has a fixed length of travel.

5. A cover release mechanism as claimed in claim 1, wherein each of the plungers is provided with means to enable the length of travel, either alone or relative to another plunger, to be adjusted.

6. A cover release mechanism as claimed in claim 1, wherein there are a pair of plungers acting in opposite directions under the control of the operating mechanism.

7. A cover release mechanism as claimed in claim 6, which includes a circular base on which the plungers are mounted to act diametrically and self-centering means on the plungers which cooperate with the base.

8. A cover release mechanism as claimed in claim 1, wherein each sealing member comprises a plug member which is provided with sealing means.

9. A cover release mechanism as claimed in claim 1, wherein each sealing member can be connected to the plungers after the cover has been installed.

10. A cover release mechanism as claimed in claim 1, which is also provided with means which prevents premature operation of the operating mechanism.

11. A cover release mechanism as claimed in claim 1, wherein said means which prevents premature operation of the cover release mechanism comprises at least one pin which is sheared upon activation of the operating mechanism.

12. A cover release mechanism as claimed in claim 1, wherein two slidably engaged members are used to enclose a high energy source, so that when the source is activated each of the slidably engaged members engages a distinct group of plungers.

13. A cover release mechanism as claimed in claim 1, wherein the high energy release mechanism includes a high energy source which forces a single member to act against all the plungers.

14. A cover release mechanism as claimed in claim 1, wherein the operating mechanism comprises a rotatable plate which is connected to each plunger so that rotation of the plate causes displacement of each plunger.

15. A cover release mechanism as claimed in claim 1, wherein the high energy release mechanism is provided with an energy source which includes an explosive charge which projects at least one member so as to engage at least one of the plungers.

16. A cover release mechanism as claimed in claim 1, wherein the cover is also provided with a release means which once the cover release mechanism has been activated acts to force the cover from position.

17. A cover release mechanism as claimed in claim 16, wherein the release means comprises a compression spring which acts to force the cover from position, upon reduction of the inwardly acting pressure differential.

18. A cover release mechanism for use with a pressure tight cover and which enables the cover to be released whilst being subjected to a high inwardly acting pressure differential, comprises:
an operating mechanism having at least one plunger mounted within the cover and sealing means associated with said plunger; and
a high energy actuator mounted within the cover so that it acts in association with the operating mechanism;
wherein under normal operating conditions, with the cover member secured in position, the plunger engages in a throughbore in the cover and the sealing means forms a seal between the plunger and the throughbore, and when the cover member is to be removed the high energy actuator is activated causing the plunger and sealing means to move and disengage from the throughbore enabling pressure equalization to occur and release of the cover to be achieved.

* * * * *